(12) United States Patent
Yoshida et al.

(10) Patent No.: US 12,500,574 B2
(45) Date of Patent: Dec. 16, 2025

(54) ACTIVE FILTER DEVICE AND ELECTRIC COMPRESSOR COMPRISING SAME

(71) Applicant: SANDEN CORPORATION, Gunma (JP)

(72) Inventors: Hiroshi Yoshida, Isesaki (JP); Koji Kobayashi, Isesaki (JP); Tatsuki Kashihara, Isesaki (JP)

(73) Assignee: SANDEN CORPORATION, Gunma (JP)

( * ) Notice: Subject to any disclaimer, the term of this patent is extended or adjusted under 35 U.S.C. 154(b) by 7 days.

(21) Appl. No.: 18/726,521

(22) PCT Filed: Jan. 16, 2023

(86) PCT No.: PCT/JP2023/000936
§ 371 (c)(1),
(2) Date: Jul. 3, 2024

(87) PCT Pub. No.: WO2023/140209
PCT Pub. Date: Jul. 27, 2023

(65) Prior Publication Data
US 2025/0080086 A1    Mar. 6, 2025

(30) Foreign Application Priority Data
Jan. 19, 2022 (JP) .................... 2022-006092

(51) Int. Cl.
*H03H 11/12* (2006.01)
(52) U.S. Cl.
CPC .............. *H03H 11/1217* (2013.01)
(58) Field of Classification Search
CPC ... H03H 11/1217; H03H 7/427; H02M 7/537; H02M 1/12; H02M 1/143; H02M 1/15; H02M 1/123

(Continued)

(56) References Cited

U.S. PATENT DOCUMENTS 9,130,542 B1 *  9/2015  Ishihara ............... H03H 11/126
11,218,069 B2 * 1/2022  Yamamoto ........... H02M 7/5395
(Continued)

FOREIGN PATENT DOCUMENTS

JP         3044650 B2    5/2000
JP      2008-078844 A    4/2008
(Continued)

OTHER PUBLICATIONS

International Search Report issued in PCT/JP2023/000936; mailed Mar. 20, 2023.

*Primary Examiner* — Ryan Jager
(74) *Attorney, Agent, or Firm* — Studebaker Brackett PLLC

(57) ABSTRACT

Provided is an active filter device capable of effectively reducing common mode noise and differential mode noise and optimizing filter characteristics. The active filter device includes an inverting amplifier circuit 37 that inverts and amplifies a common mode voltage and a differential amplifier circuit 64 that differentially amplifies a differential mode voltage, and an output voltage of the inverting amplifier circuit 37 is applied as a common mode compensation voltage to Y capacitors 21, 22, an output of the differential amplifier circuit 64 obtained by amplifying a voltage of a positive-side power supply line 11 is applied as a differential mode compensation voltage to a negative-side X capacitor 42, and an output of the differential amplifier circuit 64 obtained by amplifying a voltage of a negative-side power supply line 12 is applied as a differential mode compensation voltage to a positive-side X capacitor 41.

7 Claims, 8 Drawing Sheets

(58) Field of Classification Search
USPC .......................................................... 327/552
See application file for complete search history.

(56) References Cited

U.S. PATENT DOCUMENTS

| | | | |
|---|---|---|---|
| 2013/0010506 A1* | 1/2013 | Sakai ....................... | H02M 1/15 |
| | | | 363/126 |
| 2015/0078051 A1* | 3/2015 | Oswald ................... | H02M 1/12 |
| | | | 363/126 |
| 2015/0323569 A1* | 11/2015 | Ravezzi ........... | G01R 19/16552 |
| | | | 324/123 R |
| 2021/0075312 A1* | 3/2021 | Yoshida .............. | H02J 7/00714 |
| 2025/0080086 A1* | 3/2025 | Yoshida ................ | H02M 1/123 |

FOREIGN PATENT DOCUMENTS

| | | |
|---|---|---|
| JP | 5528543 B2 | 6/2014 |
| JP | 2019-205286 A | 11/2019 |
| JP | 2020-088627 A | 6/2020 |
| JP | 2021-108514 A | 7/2021 |

* cited by examiner

ACTIVE FILTER DEVICE AND ELECTRIC COMPRESSOR COMPRISING SAME

TECHNICAL FIELD

The present invention relates to an active filter device for suppressing common mode noise and differential mode noise, and an electric compressor including the active filter device.

BACKGROUND ART

A passive common mode noise filter (passive filter) for reducing common mode noise includes a Y capacitor connected between a pair of power supply lines and a ground potential, and a common mode choke coil inserted into the pair of power supply lines (see, for example, Patent Literature 1).

However, for example, in the case of an inverter device that drives a motor of an electric compressor, when an attempt is made to use the Y capacitor which is a component in order to improve attenuation characteristics of the passive common mode noise filter, it is necessary to adopt one with a restriction on a capacitance value from the viewpoint of safety due to an increase in a leakage current or one with an unrealistic capacitance value. Even if the common mode choke coil is used, there is a problem that there is a dimensional restriction on a mountable coil.

For these reasons, various common mode noise filters adopting an active method have been developed (see, for example, Patent Literatures 2 to 3).

CITATION LIST

Patent Literature

Patent Literature 1: JP-A-2008-78844
Patent Literature 2: Japanese Patent No. 3044650
Patent Literature 3: Japanese Patent No. 5528543
Patent Literature 4: JP-A-2019-205286

SUMMARY OF INVENTION

Problems to be Solved by Invention

However, in any of the above-described literatures, a common mode transformer is required for detection and compensation of common mode noise, and an active filter device is increased in size. For this reason, improvement has been demanded.

In an actual circuit, differential mode noise increases due to mode conversion caused by, e.g., circuit unbalance of a differential mode path. This passive differential mode noise filter for reducing the differential mode noise includes an X capacitor connected between a pair of power supply lines and a normal mode choke coil connected to each of the pair of power supply lines (see, for example, Patent Literature 4). However, development of an active filter device capable of reducing the differential mode noise together with the above-described common mode noise has been desired.

The present invention has been made to solve the conventional technical problems, and an object thereof is to provide an active filter device capable of effectively reducing common mode noise and differential mode noise and optimizing filter characteristics and an electric compressor including the active filter device.

Solution to Problems

The active filter device of the present invention includes a common mode choke coil inserted into a pair of positive-side and negative-side power supply lines, a normal mode choke coil connected to the pair of power supply lines or one of the power supply lines, a detection unit that detects the voltages of the pair of power supply lines, an inverting amplifier circuit that inverts and amplifies a common mode voltage detected by the detection unit, a Y capacitor connected between an output of the inverting amplifier circuit and the pair of power supply lines, a differential amplifier circuit that differentially amplifies a differential mode voltage between the pair of power supply lines, which is detected by the detection unit, and an X capacitor connected between an output of the differential amplifier circuit and the pair of power supply lines, in which an output voltage of the inverting amplifier circuit is applied to the Y capacitor, and an output voltage of the differential amplifier circuit obtained by amplifying the voltage of the positive-side power supply line is applied to the X capacitor connected to the negative-side power supply line, and an output voltage of the differential amplifier circuit obtained by amplifying the voltage of the negative-side power supply line is applied to the X capacitor connected to the positive-side power supply line.

The active filter device of the invention according to claim 2 is configured in the above-described invention such that the differential amplifier circuit includes a positive-side amplifier having a non-inverting input terminal to which the voltage of the positive-side power supply line detected by the detection unit is input as a differential input signal, and a negative-side amplifier having a non-inverting input terminal to which the voltage of the negative-side power supply line detected by the detection unit is input as a differential input signal, and the X capacitor connected to the negative-side power supply line is connected to an output of the positive-side amplifier, and the X capacitor connected to the positive-side power supply line is connected to an output of the negative-side amplifier.

The active filter device of the invention according to claim 3 is configured in each invention described above such that a voltage detected by a single detection unit including a pair of voltage detection capacitors is input to the inverting amplifier circuit and the differential amplifier circuit.

The active filter device of the invention according to claim 4 is configured in the invention according to claim 1 or 2 such that the detection unit is provided for each of the inverting amplifier circuit and the differential amplifier circuit.

The active filter device of the invention according to claim 5 is configured in each invention described above such that a ground path of the detection unit and a ground path of the inverting amplifier circuit are separately connected to a circuit ground.

An electric compressor of the invention according to claim 6 includes the active filter device according to each invention described above and an inverter device, the active filter device and the inverter device being provided integrally with a housing.

The electric compressor of the invention according to claim 7 is configured in the invention described above such that the housing has a ground potential and the circuit ground is connected to the housing, and the ground path of the detection unit is connected to the housing and the ground path of the inverting amplifier circuit is connected to the circuit ground.

Effects of Invention

The active filter device of the present invention includes the common mode choke coil inserted into the pair of positive-side and negative-side power supply lines, the normal mode choke coil connected to the pair of power supply lines or one of the power supply lines, the detection unit that detects the voltages of the pair of power supply lines, the inverting amplifier circuit that inverts and amplifies the common mode voltage detected by the detection unit, the Y capacitor connected between the output of the inverting amplifier circuit and the pair of power supply lines, the differential amplifier circuit that differentially amplifies the differential mode voltage between the pair of power supply lines, which is detected by the detection unit, and the X capacitor connected between the output of the differential amplifier circuit and the pair of power supply lines, in which the output voltage of the inverting amplifier circuit is applied to the Y capacitor, and the output voltage of the differential amplifier circuit obtained by amplifying the voltage of the positive-side power supply line is applied to the X capacitor connected to the negative-side power supply line, and the output voltage of the differential amplifier circuit obtained by amplifying the voltage of the negative-side power supply line is applied to the X capacitor connected to the positive-side power supply line.

With this configuration, an apparent capacitance value of the Y capacitor increases according to the gain of the inverting amplifier circuit. With such an increase in the apparent capacitance value of the Y capacitor, it is possible to increase the reflux of a noise current and reduce a common mode current leaking to the power supply side without using a large capacity Y capacitor or a large common mode choke coil.

Moreover, the apparent capacitance value of the X capacitor also increases according to the gain of the differential amplifier circuit. With such an increase in the apparent capacitance value of the X capacitor, it is possible to increase the reflux of a noise current and reduce a differential mode current leaking to the power supply side without using a large capacity X capacitor or a large normal mode choke coil.

Further, the present invention can be applied to a normal passive noise filter including a common mode choke coil, a normal mode choke coil, a Y capacitor, and an X capacitor to improve attenuation characteristics of common mode noise and differential mode noise, and therefore, versatility is enhanced.

In particular, since the compensation voltage output gains of the inverting amplifier circuit and the differential amplifier circuit can be individually set, filter characteristics can be optimized by selecting and combining the filter circuit elements (Y capacitor, X capacitor, common mode choke coil, normal mode choke coil) according to a difference in EMI characteristics due to a mode.

Actually in this case, as in the invention according to claim 2, the differential amplifier circuit includes the positive-side amplifier having the non-inverting input terminal to which the voltage of the positive-side power supply line detected by the detection unit is input as a differential input signal, and the negative-side amplifier having the non-inverting input terminal to which a voltage of the negative-side power supply line detected by the detection unit is input as the differential input signal, and the X capacitor connected to the negative-side power supply line is connected to the output of the positive-side amplifier and the X capacitor connected to the positive-side power supply line is connected to the output of the negative-side amplifier, so that the apparent capacitance value of the X capacitor increases.

As in the invention according to claim 3, the voltage detected by the single detection unit including the pair of voltage detection capacitors is input to the inverting amplifier circuit and the differential amplifier circuit, so that the circuit configuration of the detection unit can be simplified.

As in the invention according to claim 4, the detection unit is provided for each of the inverting amplifier circuit and the differential amplifier circuit, so that there is an advantage that it is possible to obtain noise voltage detection characteristics according to common mode and differential mode frequency characteristics.

As in the invention according to claim 5, the ground path of the detection unit and the ground path of the inverting amplifier circuit are separately connected to the circuit ground, so that it is possible to reduce an adverse effect on detection of the common mode voltage by the detection unit due to voltage fluctuation with respect to the circuit ground caused by the operation current of the inverting amplifier circuit.

The active filter device according to each invention described above is extremely suitable in a case where the active filter device is provided integrally with the housing of the electric compressor together with the inverter device as in the invention according to claim 6.

As in the invention according to claim 7, the housing has the ground potential, the circuit ground is connected to the housing, the ground path of the detection unit is connected to the housing, and the ground path of the inverting amplifier circuit is connected to the circuit ground, so that it is possible to eliminate a detection error of the detection unit due to potential fluctuation in the circuit ground caused by the operation current of the inverting amplifier circuit.

DESCRIPTION OF EMBODIMENTS

Hereinafter, embodiments of the present invention will be described in detail with reference to the drawings.

Example 1

Figure 1:
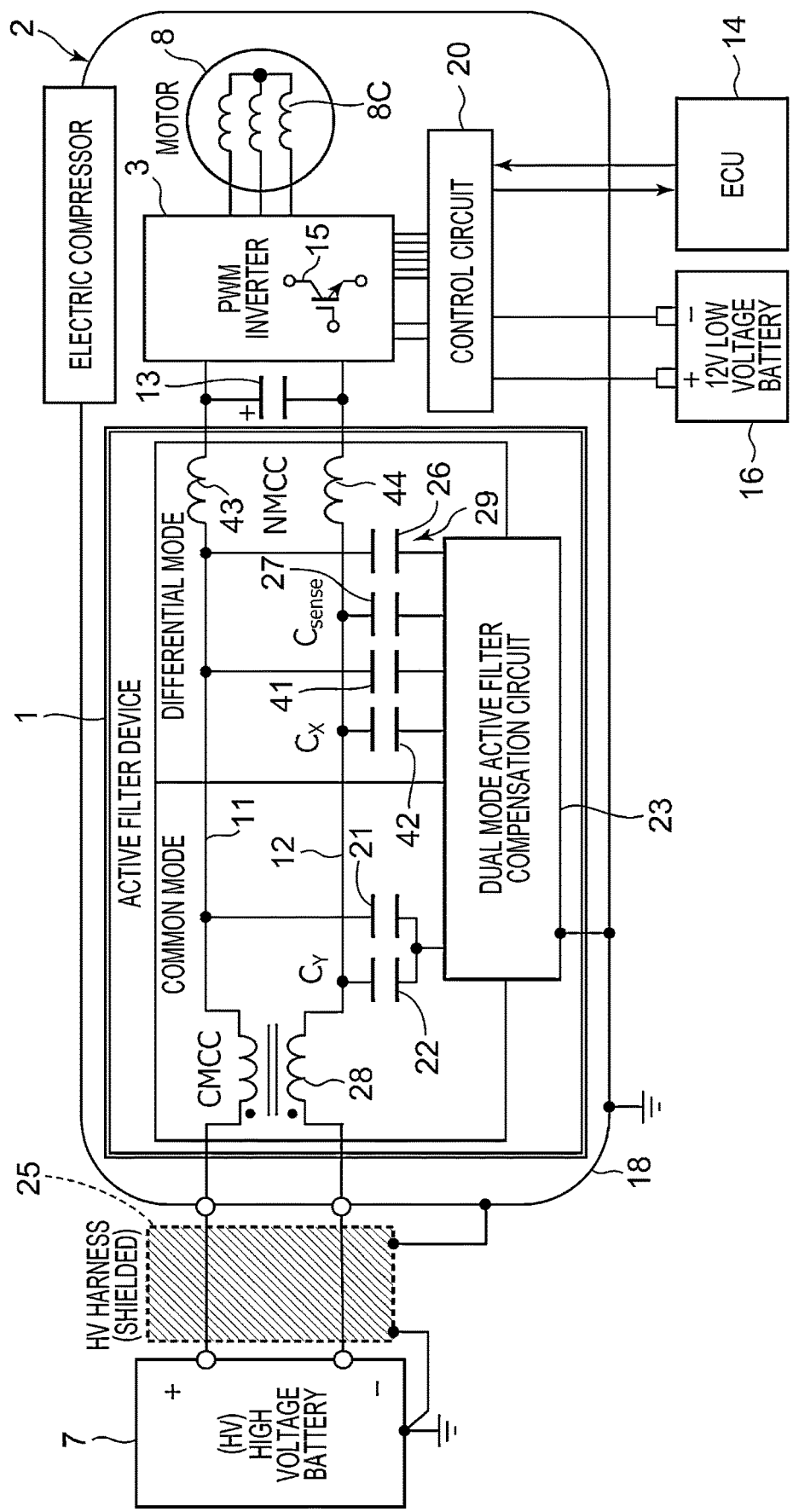
FIG. 1 is an electric circuit diagram of an electric compressor of an example to which an active filter device of the present invention is applied and a power supply path to the electric compressor.
Figure 2:
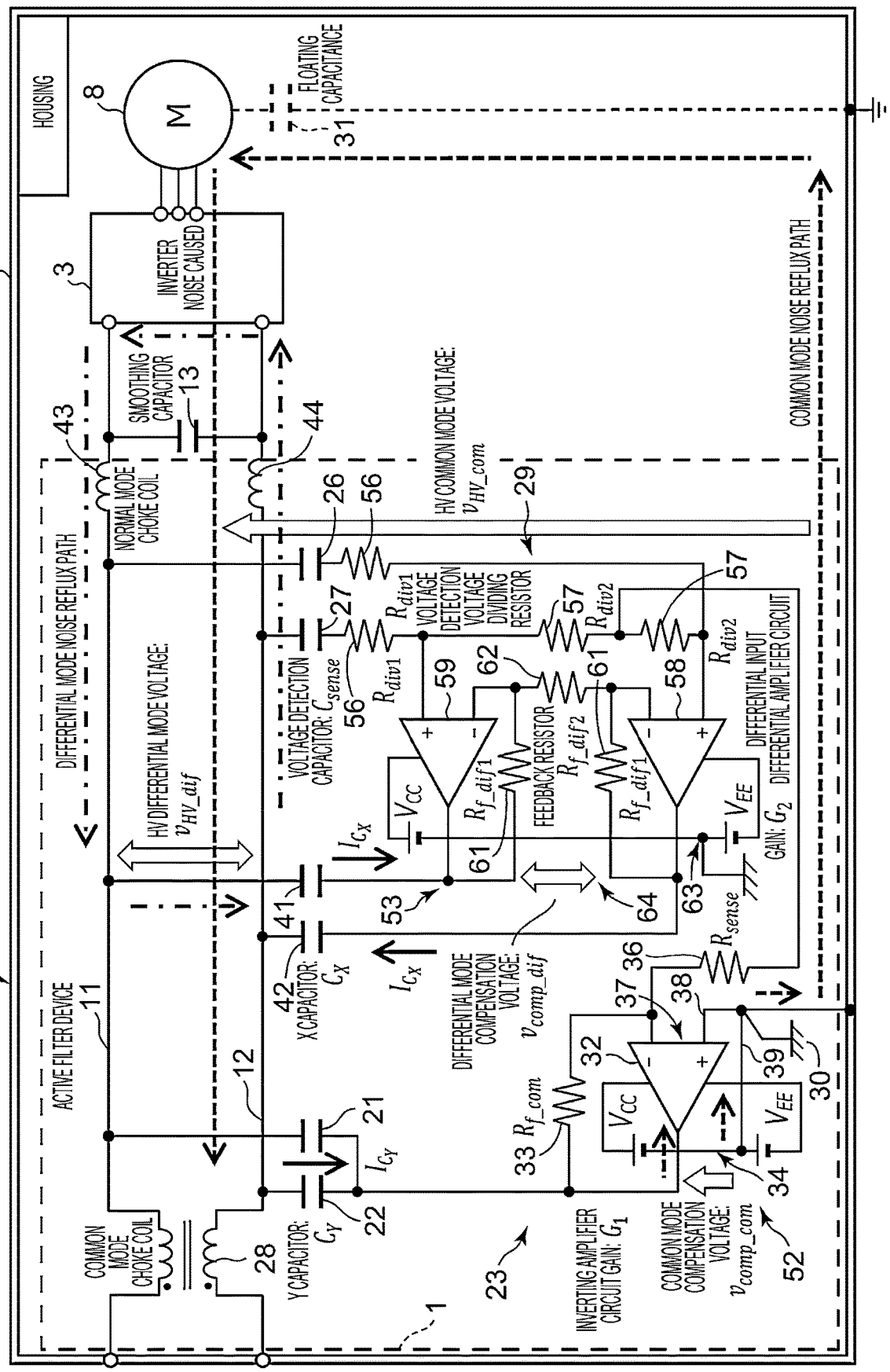
FIG. 2 is an electric circuit diagram of the electric compressor of FIG. 1 (Example 1)

FIG. 1 shows an electric circuit diagram of an electric compressor 2 of an example to which an active filter device 1 of the present invention is applied and a power supply path to the electric compressor 2, and FIG. 2 shows an electric circuit diagram of the electric compressor 2. The electric compressor 2 of the example is mounted on a vehicle such as an electric vehicle or a hybrid vehicle and forms part of a refrigerant circuit of a vehicle air-conditioning device that air-conditions the inside of a vehicle compartment, and an inverter device (PWM inverter) 3 and the active filter device 1 of the present invention are provided integrally with a later-described housing 18 of the electric compressor 2. That is, the electric compressor 2 of the example is an inverter-integrated electric compressor.

The inverter device 3 converts a DC voltage from a high voltage battery 7 (HV such as DC 350 V) mounted as a DC power supply on the vehicle into an AC voltage of an arbitrary frequency, supplies the AC voltage to a motor 8 of the electric compressor 2, and operates the electric compressor 2, and the active filter device 1 of the example of the present invention is provided to reduce common mode noise and differential mode noise generated in the inverter device 3.

(1) Power Supply Path to Electric Compressor 2

In FIG. 1, the inverter device 3 includes a plurality of switching elements (IGBTs) 15 connected to a positive-side power supply line 11 and a negative-side power supply line 12 of the high voltage battery 7. In FIG. 1, a reference numeral 20 indicates a control circuit, and each switching element 15 of the inverter device 3 is subjected to switching control (PWM control) by the control circuit 20. Moreover, a reference numeral 13 indicates a smoothing capacitor connected between the pair of power supply lines 11, 12.

Note that a reference numeral 14 indicates an ECU of the vehicle, and a reference numeral 16 indicates a low voltage battery (DC 12 V), and the control circuit 20 performs the switching control on each switching element 15 of the inverter device 3 using the low voltage battery 16 as a power supply based on a command from the ECU 14. Further, a reference numeral 18 indicates the housing (formed by aluminum die casting) of the electric compressor 2. In addition, the electric compressor 2 is connected to the high voltage battery 7 via a shielded HV harness 25 (forming the pair of power supply lines 11, 12), and the housing 18 of the electric compressor 2 is directly fixed to a vehicle body of the vehicle. With this configuration, the housing 18 has a ground potential.

The active filter device 1 of the example includes a dual mode active filter compensation circuit 23, Y capacitors ($C_Y$) 21, 22 and X capacitors ($C_X$) 41, 42 connected between the pair of power supply lines 11, 12 and the output of the dual mode active filter compensation circuit 23, voltage detection capacitors 26, 27 ($C_{sense}$: forming a detection unit 29 in the present invention) connected between the pair of power supply lines 11, 12 and the dual mode active filter compensation circuit 23, a common mode choke coil (CMCC) 28 inserted into the pair of power supply lines 11, 12 on the high voltage battery 7 side with respect to the Y capacitors 21, 22, the X capacitors 41, 42, the dual mode active filter compensation circuit 23, and the voltage detection capacitors 26, 27, and normal mode choke coils (NMCCs) 43, 44 connected to the pair of power supply lines 11, 12 on the smoothing capacitor 13 (inverter device 3) side with respect to the Y capacitors 21, 22, the X capacitors 41, 42, the dual mode active filter compensation circuit 23, and the voltage detection capacitors 26, 27.

In this case, the Y capacitors 21, 22 are in such a form that the dual mode active filter compensation circuit 23 is connected between the Y capacitors 21, 22 and the housing 18 (ground potential). On the other hand, the X capacitors 41, 42 are in such a form that the dual mode active filter compensation circuit 23 is inserted between the X capacitors 41, 42. In the example, the normal mode choke coils 43, 44 are each connected to the pair of power supply lines 11, 12, but any one of the normal mode choke coils 43, 44 may be connected to only any one of the power supply lines 11, 12.

(2) Electric Circuit of Electric Compressor 2

Next, FIG. 2 shows only the electric circuit of the electric compressor 2. In this figure, the same reference numerals as those in FIG. 1 indicate the same elements. Insulating paper, refrigerant, or oil is interposed between a winding 8C of the motor 8 and the housing 18, and a floating capacitance between the winding 8C of the motor 8 and the housing 18 is indicated by 31 in FIG. 2. A noise current flows through the floating capacitance 31, and the common mode noise is generated.

(2-1) Dual Mode Active Filter Compensation Circuit 23

FIG. 2 shows details of the dual mode active filter compensation circuit 23 of the active filter device 1. The dual mode active filter compensation circuit 23 of the example forms main part of a common mode voltage compensation unit 52 and a differential mode voltage compensation unit 53.

(2-2) Common Mode Voltage Compensation Unit 52

Of these units, the common mode voltage compensation unit 52 includes an amplifier 32, a negative feedback resistor ($R_{f\_com}$) 33 connected between an inverting input terminal (−) and an output terminal of the amplifier 32, a power supply circuit ($V_{CC}$, $V_{EE}$) 34 connected to a positive power supply terminal and a negative power supply terminal of the amplifier 32 (elements described so far are included in the dual mode active filter compensation circuit 23), the Y capacitors 21, 22, and the common mode choke coil 28.

The amplifier 32, the negative feedback resistor 33, and a common mode voltage detection resistor 36 form an inverting amplifier circuit 37 (gain $G_1$) according to the present invention. Further, one ends of the voltage detection capacitors 26, 27 are each connected to the pair of power supply lines 11, 12, and the other ends of the voltage detection capacitors 26, 27 are connected to one end of the common mode voltage detection resistor ($R_{sense}$) 36 via voltage detection voltage dividing resistors ($R_{div1}$) 56, ($R_{div2}$) 57. These two voltage detection voltage dividing resistors 56, 57 and the common mode voltage detection resistor 36 also form the detection unit 29 together with the voltage detection capacitors 26, 27.

The other end of the common mode voltage detection resistor 36 is connected to the inverting input terminal (−) of the amplifier 32. In addition, in this example, a non-inverting input terminal (+) of the amplifier 32 is connected to a circuit ground 30 via a ground path 38. The ground path 38 serves as a ground path of the detection unit 29. Note that the circuit ground 30 is connected to the housing 18 having the ground potential.

On the other hand, one ends of the Y capacitors 21, 22 described above are each connected to the pair of power supply lines 11, 12. The other ends of the Y capacitors 21, 22 are both connected to the output terminal of the amplifier 32. A ground path 39 of the power supply circuit 34 of the amplifier 32 is connected to the circuit ground 30 separately from the ground path 38 in this example. The ground path 39 is a ground path of the inverting amplifier circuit 37. With this configuration, each of the Y capacitors 21, 22 is connected between the pair of power supply lines 11, 12 and the housing 18 (ground potential) via the amplifier 32 of the inverting amplifier circuit 37, and the output voltage of the inverting amplifier circuit 37 (amplifier 32) is applied to the Y capacitors 21, 22 as a common mode compensation voltage.

(2-3) Differential Mode Voltage Compensation Unit 53

On the other hand, the differential mode voltage compensation unit 53 includes two amplifiers 58, 59 on the positive side and the negative side, feedback resistors ($R_{f\_dif1}$) 61 connected between inverting input terminals (−) and output terminals of the amplifiers 58, 59, a feedback resistor ($R_{f\_dif2}$) 62 connected between the inverting input terminals (−) of the amplifiers 58, 59, a power supply circuit ($V_{CC}$, $V_{EE}$) 63 connected to a positive power supply terminal and a negative power supply terminal of each of the amplifiers 58, 59 (elements described so far are included in the dual mode active filter compensation circuit 23), the X capacitors 41, 42, and the normal mode choke coils 43, 44. The amplifiers 58, 59 and the feedback resistors 61, 62 form a differential amplifier circuit (differential input differential amplifier circuit) 64 (gain $G_2$) according to the present invention.

A voltage between the voltage detection voltage dividing resistors 56, 57 connected to the voltage detection capacitor 26 connected to the positive-side power supply line 11 is input to a non-inverting input terminal (+) of the amplifier 58 (positive-side amplifier) as a differential input signal, and a voltage between the voltage detection voltage dividing resistors 56, 57 connected to the voltage detection capacitor 27 connected to the negative-side power supply line 12 is input to a non-inverting input terminal (+) of the amplifier 59 (negative-side amplifier) as a differential input signal.

On the other hand, one ends of the X capacitors 41, 42 described above are each connected to the pair of power supply lines 11, 12. The other end of the X capacitor 41 (positive-side X capacitor) connected to the positive-side power supply line 11 is connected to the output terminal of the negative-side amplifier 59, and the other end of the X capacitor 42 (negative-side X capacitor) connected to the negative-side power supply line 12 is connected to the output terminal of the positive-side amplifier 58.

With this configuration, the differential amplifier circuit 64 is inserted between the X capacitors 41, 42, the output (positive-side differential amplification output) of the positive-side amplifier 58 of the differential amplifier circuit 64 is applied as a differential mode compensation voltage to the X capacitor 42 (negative-side X capacitor) connected to the negative-side power supply line 12, and the output (negative-side differential amplification output) of the negative-side amplifier 59 of the differential amplifier circuit 64 is applied as a differential mode compensation voltage to the X capacitor 41 (positive-side X capacitor) connected to the positive-side power supply line 11.

(3) Action (Operation) of Active Filter Device 1

Action (operation) of the active filter device 1 of this example with the above-described configuration will be described with reference to FIGS. 2 to 7. Note that in FIGS. 3 to 7, the same reference numerals as those in FIGS. 1 and 2 indicate the same elements.

(3-1) Action (Operation) of Common Mode Voltage Compensation Unit 52

Figure 3:
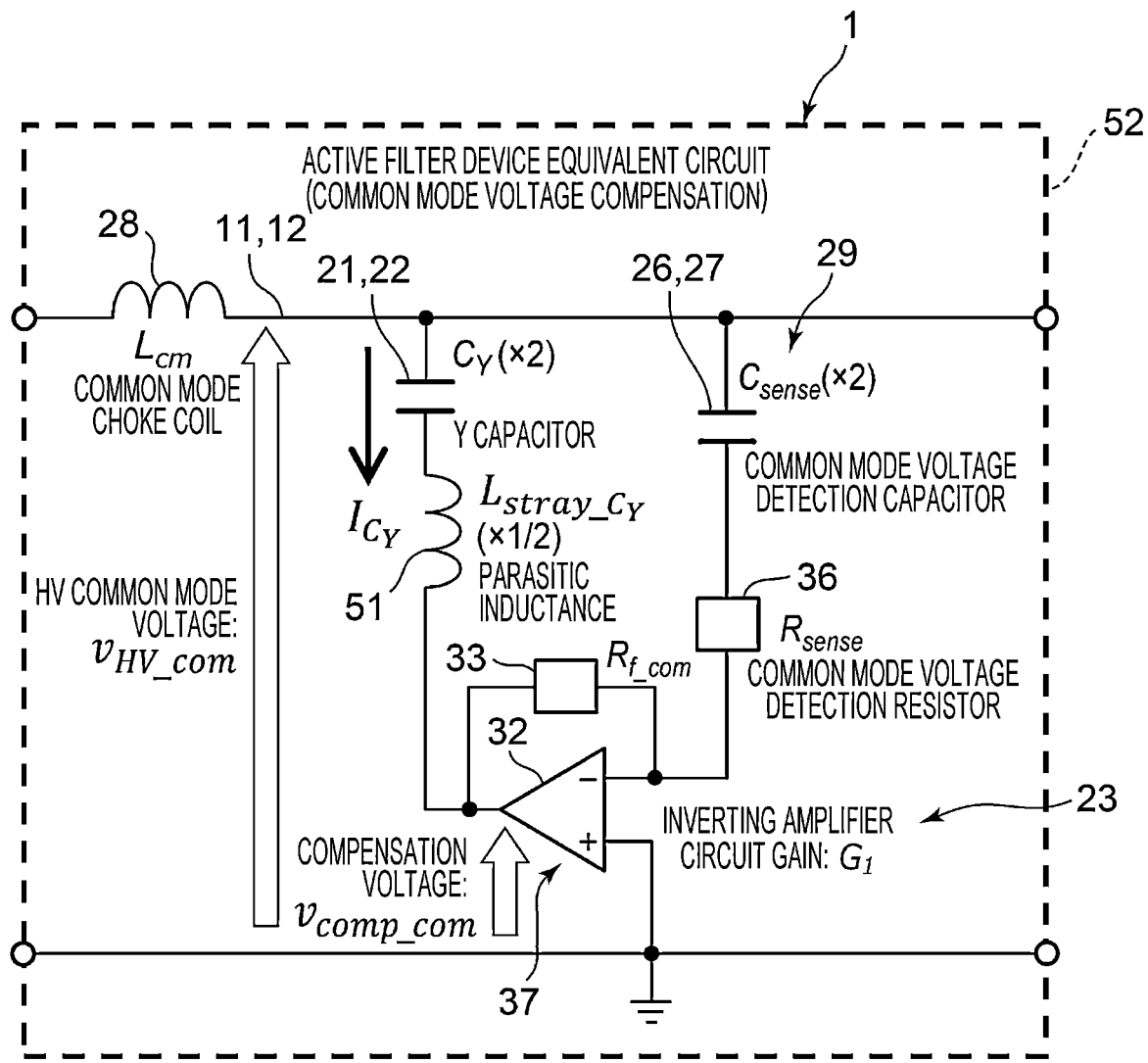
FIG. 3 is an equivalent circuit diagram related to common mode voltage compensation of the active filter device of FIG. 2.

First, action (operation) of the common mode voltage compensation unit 52 will be described with reference to FIGS. 3 to 5. FIG. 3 shows an equivalent circuit of the common mode voltage compensation unit 52 of the active filter device 1. Note that in an actual circuit, the Y capacitor 21, 22 has a parasitic inductance 51 ($L_{stray\_Cy}$) (FIG. 3). In the following description, the resistance of the voltage dividing detection resistor 56, 57 is considered to be included in the resistance value $R_{sense}$ of the common mode voltage detection resistor 36.

When a common mode voltage (HV common mode voltage) in the power supply line 11, 12 is represented by $v_{HV\_com}$ and the common mode compensation voltage of the inverting amplifier circuit 37 is represented by $v_{comp\_com}$, the common mode voltage (HV common mode voltage) $v_{HV\_com}$ can be represented by Equation (I) below because the input terminal of the inverting amplifier circuit 37 to which the common mode voltage detection resistor 36 is connected is a virtual ground. Note that $R_{sense}$ is a resistance value of the common mode voltage detection resistor 36, $C_{sense}$ is a capacitance value of the voltage detection capacitor 26, 27, and $C_{sense}(\times 2)$ means a combined capacitance value thereof. $G_1$ is the gain of the inverting amplifier circuit 37, and $G_1 = R_{f\_com}/R_{sense}$. $R_{f\_com}$ is a resistance value of the negative feedback resistor 33.

Further, $L_{stray\_Cy}$ is an inductance value of the parasitic inductance 51, and $L_{stray\_Cy}(\times \frac{1}{2})$ means a combined inductance value thereof. $C_Y$ is a capacitance value of the Y capacitor 21, 22, and $C_Y(\times 2)$ means a combined capacitance value thereof. Further, Icy is a current flowing through the Y capacitor 21, 22.

[Equation 1]

$$v_{HV\_com} = \left(\frac{1}{j\omega C_Y(\times 2)} + j\omega L_{stray\_C_Y}(\times 1/2)\right) \cdot I_{CY} - G_1 \cdot \left(v_{HV\_com} \cdot \frac{R_{sense}}{R_{sense} + 1/j\omega C_{sense}(\times 2)}\right) \quad (I)$$

According to Equation (I), Equation (II) below is established.

[Equation 2]

$$v_{HV\_com} = \frac{\left(R_{sense} + 1/j\omega C_{sense}(\times 2)\right) \cdot \left(1/j\omega C_Y(\times 2) + j\omega L_{stray\_C_y}(\times 1/2)\right)}{(1 + G_1) \cdot R_{sense} + 1/j\omega C_{sense}(\times 2)} \cdot I_{CY} \quad (II)$$

Assuming that the impedance of the Y capacitor 21, 22 due to compensation of the inverting amplifier circuit 37 of the dual mode active filter compensation circuit 23 is $Z_{Cy}$, the impedance $Z_{Cy}$ is expressed by Equation (III) below.

[Equation 3]

$$Z_{C_y} = \frac{v_{HV\_com}}{I_{CY}} \quad (III)$$

When the impedance $Z_{Cy}$ is expressed by the combined capacitance value $C_{sense}(\times 2)$ of the voltage detection capacitor 26, 27, the resistance value $R_{sense}$ of the common mode voltage detection resistor 36, the combined capacitance value $C_Y(\times 2)$ of the Y capacitor 21, 22, and the inductance value $L_{stray\_Cy}$ of the parasitic inductance 51 using Equations (I) to (III), Equation (IV) below is obtained.

[Equation 4]

$$Z_{C_y} = \frac{R_{sense} + 1/i\omega C_{sense}(\times 2)}{(1+G_1) \cdot R_{sense} + 1/j\omega C_{sense}(\times 2)} \cdot \left( \frac{1}{j\omega C_Y(\times 2)} + j\omega L_{stray\_C_Y}(\times 1/2) \right) \quad \text{(IV)}$$

Here, in a high frequency range, the capacitance value $C_{sense}$ of the voltage detection capacitor 26, 27, the resistance value $R_{sense}$ of the common mode voltage detection resistor 36, etc. are selected such that the impedance of the voltage detection capacitor 26, 27 is ignorable with respect to the impedance of the common mode voltage detection resistor 36, whereby Equation (IV) can be regarded as Equation (V) below.

[Equation 5]

$$Z_{C_y} = \frac{1}{1+G_1} \cdot \left( \frac{1}{j\omega C_Y(\times 2)} + j\omega L_{stray\_C_Y}(\times 1/2) \right) \quad \text{(V)}$$

Equation (V) means that it is equivalent to a Y capacitor of $(1+G_1)$ times being connected. That is, due to compensation of the inverting amplifier circuit 37 of the dual mode active filter compensation circuit 23, the capacitance value of the Y capacitor 21, 22 apparently increases $(1+G_1)$ times. Note that the inductance value of the parasitic inductance 51 is equivalently reduced $(1/(1+G_1))$.

As described above, since the inverting amplifier circuit 37 that inverts and amplifies the common mode voltage $v_{HV\_com}$ detected by the detection unit 29 is provided and the output voltage of the inverting amplifier circuit 37 is applied to the Y capacitor 21, 22 as the common mode compensation voltage $v_{comp\_com}$, the apparent capacitance value of the Y capacitor 21, 22 increases $((1+G_1)$ times) according to the gain $G_1$ of the inverting amplifier circuit 37.

Figure 4:
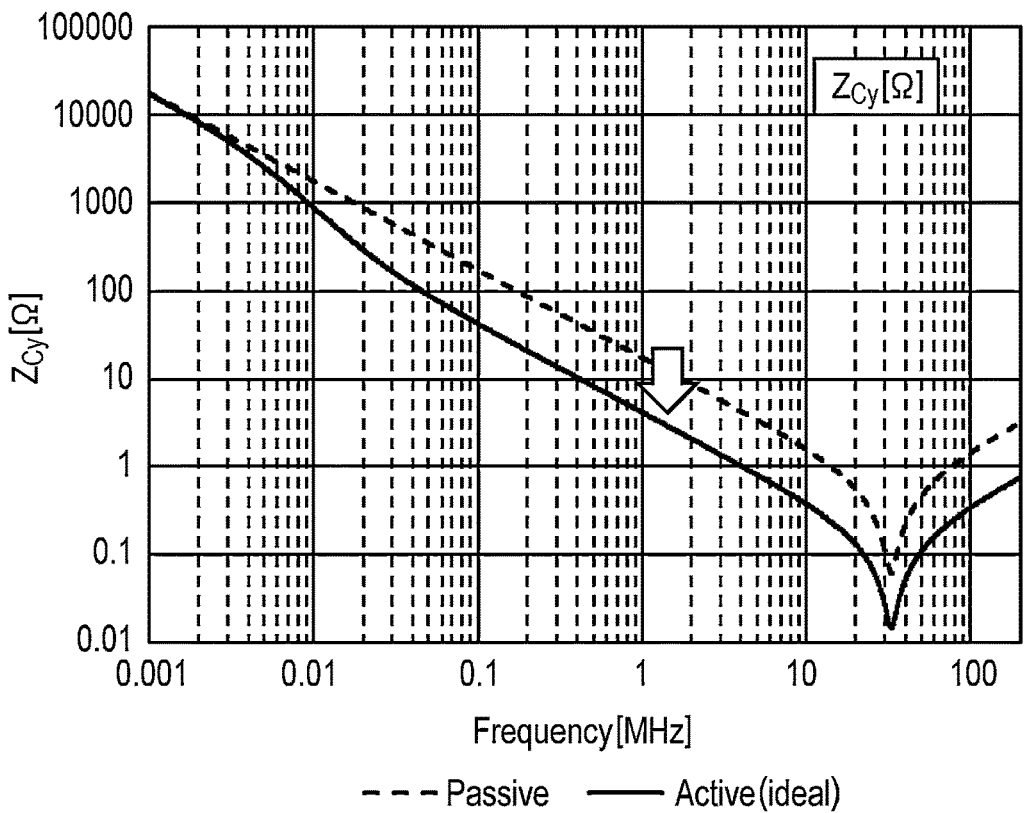
FIG. 4 is a graph showing impedance characteristics of a Y capacitor for describing a common mode noise reduction action by the active filter device of the present invention.

A broken line in FIG. 4 indicates impedance characteristics of a Y capacitor of a normal passive noise filter, and a solid line indicates impedance characteristics of the Y capacitor in the active filter device 1 of the present invention. Note that $Z_{C_y}$ is the impedance of the Y capacitor. As is clear from this figure, according to the active filter device 1 of the present invention, the capacitance value of the Y capacitor apparently increases, and the impedance $Z_{C_y}$ decreases according to the value of the gain $G_1$ as compared to the normal passive noise filter (FIG. 4 shows a change in the impedance in the case of $G_1=3$).

With the increase in the apparent capacitance value of the Y capacitor 21, 22, it is possible to increase the reflux of the common mode noise current indicated by a broken line arrow in FIG. 2, reduce the common mode current leaking to the power supply side, and reduce the common mode noise without using a large capacity Y capacitor or a large common mode choke coil.

Figure 5:
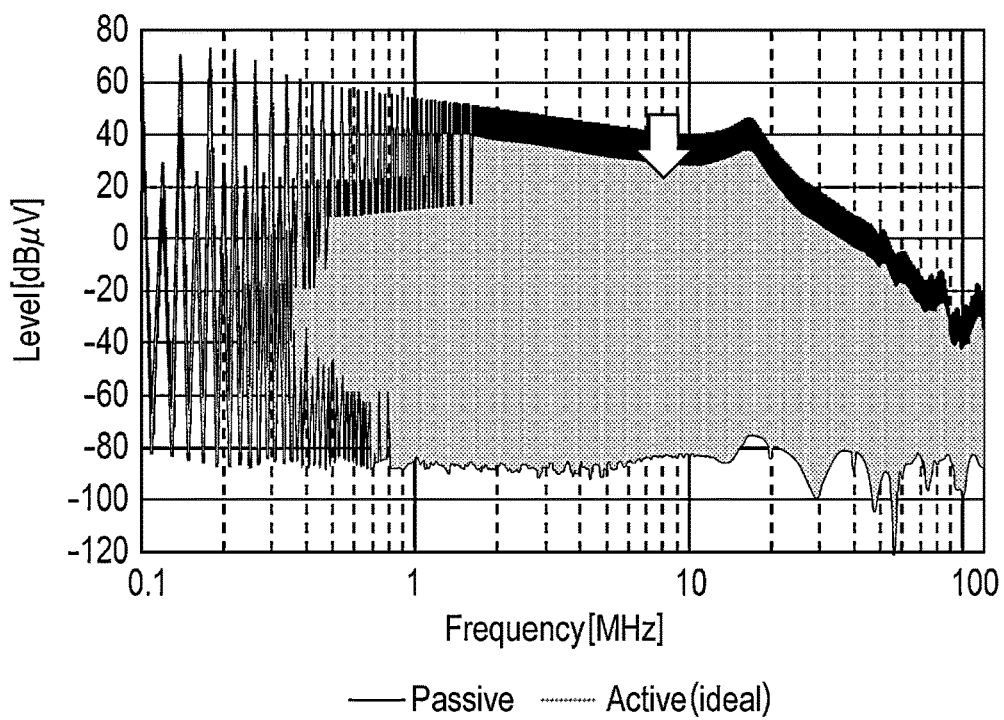
FIG. 5 is a graph for describing the common mode noise reduction action by the active filter device of the present invention.

A black portion in FIG. 5 indicates the level of common mode noise by the normal passive noise filter, and a shaded portion indicates the level of the common mode noise by the active filter device 1 of the present invention. As is clear from this figure, according to the active filter device 1 of the present invention, the common mode noise level is lower than that of the normal passive noise filter according to the decrease in the impedance of the Y capacitor.

In particular, since the dual mode active filter compensation circuit 23 can be added to the normal passive noise filter including the common mode choke coil 28 and the Y capacitors 21, 22 to improve attenuation characteristics of the common mode noise, versatility is enhanced.

(3-2) Action (Operation) of Differential Mode Voltage Compensation Unit 53

Figure 6:
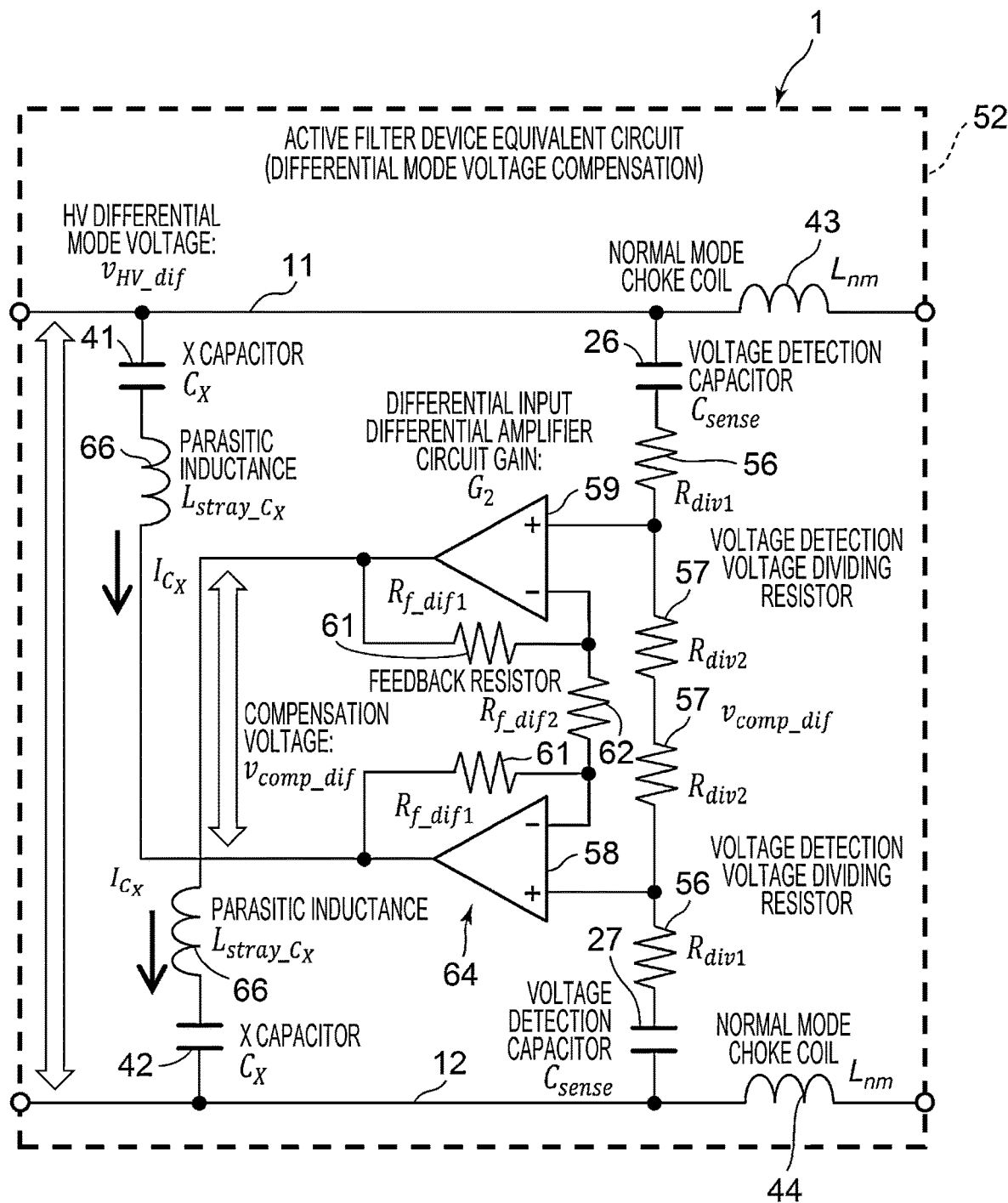
FIG. 6 is an equivalent circuit diagram related to differential mode voltage compensation of the active filter device of FIG. 2.

Next, action (operation) of the differential mode voltage compensation unit 53 will be described with reference to FIGS. 6 and 7. FIG. 6 shows an equivalent circuit of the differential mode voltage compensation unit 53 of the active filter device 1. Note that in an actual circuit, the X capacitor 41, 42 has a parasitic inductance 66 ($L_{stray\_Cx}$) (FIG. 6).

Assuming that a differential mode voltage (HV differential mode voltage) appears between the power supply lines 11, 12 is $v_{HV\_dif}$ and a voltage between the output terminal of the positive-side amplifier 58 and the output terminal of the negative-side amplifier 59 of the differential amplifier circuit 64 is a differential mode compensation voltage $v_{comp\_dif}$, the differential mode compensation voltage $v_{comp\_dif}$ and the differential mode voltage $v_{HV\_dif}$ can be expressed by Equations (VI) and (VIII) below.

[Equation 6]

$$v_{comp\_dif} = G_2 \cdot v_{HV\_dif} \cdot \frac{R_{div2}}{R_{div1} + R_{div2} + 1/j\omega C_{sense}} \quad \text{(VI)}$$

$$G_2 = 1 + (2 \cdot R_{f\_dif1}/R_{f\_dif2}) \quad \text{(VII)}$$

[Equation 7]

$$v_{HV\_dif} = 2 \cdot \left( \frac{1}{j\omega C_X} + j\omega L_{stray\_C_X} \right) \cdot I_{C_X} - G_2 \cdot v_{HV\_dif} \cdot \frac{R_{div2}}{R_{div1} + R_{div2} + 1/j\omega C_{sense}} \quad \text{(VIII)}$$

Note that $R_{div1}$ and $R_{div2}$ are resistance values of the voltage detection voltage dividing resistors 56, 57, and $C_{sense}$ is the capacitance value of the voltage detection capacitor 26, 27. $G_2$ is the gain of the differential amplifier circuit 64, and is expressed by Equation (VII). Further, $L_{stray\_CX}$ is an inductance value of the parasitic inductance 66, and $C_X$ is a capacitance value of the X capacitor 41, 42. In addition, $I_{CX}$ is a current flowing through the X capacitor 41, 42.

According to Equation (VI), when a voltage detected as the differential mode voltage (HV differential mode voltage) $v_{HV\_dif}$ between the positive-side power supply line 11 and the negative-side power supply line 12 is zero, there is no difference between the output of the positive-side amplifier 58 and the output of the negative-side amplifier 59, and the differential mode compensation voltage $v_{comp\_dif}$ becomes zero. This case is equivalent to a form in which the two X capacitors 41, 42 are connected in series.

On the other hand, in a case where there is a voltage difference as the differential mode voltage between the positive-side power supply line 11 and the negative-side power supply line 12, for example, a case where the voltage of the positive-side power supply line 11 increases by "1" and the voltage of the negative-side power supply line 12 decreases by "1," the differential mode compensation voltage $v_{comp\_dif}$ is "2," the output voltage of the positive-side amplifier 58 is applied to the X capacitor 42 connected to the negative-side power supply line 12, and the output voltage of the negative-side amplifier 59 is applied to the X capacitor 41 connected to the positive-side power supply line 11, so that the voltage difference between the power supply lines 11, 12 is reduced (compensated).

According to Equation (VIII) above, Equation (IX) below is established.

[Equation 8]

$$v_{HV\_dif} = \frac{2 \cdot \left(\frac{1}{j\omega C_X} + j\omega L_{stray\_C_X}\right)}{1 + \frac{R_{div2}}{R_{(div1)} + R_{div2} + 1/j\omega C_{sense}} \cdot G_2} \cdot I_{C_X} \quad \text{(IX)}$$

Assuming that the impedance of the X capacitor 41, 42 due to compensation of the differential amplifier circuit 64 of the dual mode active filter compensation circuit 23 is $Z_{CX}$, the impedance $Z_{CX}$ is expressed by Equation (X) below.

[Equation 9]

$$Z_{C_X} = \frac{v_{HV\_dif}}{I_{C_X}} \quad \text{(X)}$$

When the impedance $Z_{CX}$ is expressed by the capacitance value $C_{sense}$ of the voltage detection capacitor 26, 27, the resistance values $R_{div1}$, $R_{div2}$ of the voltage detection voltage dividing resistors 56, 57, the capacitance value $C_X$ of the X capacitor 41, 42, and the inductance value $L_{stray\_CX}$ of the parasitic inductance 66 using Equations (VI) to (IX), Equation (XI) below is obtained.

[Equation 10]

$$Z_{C_X} = 2 \cdot \left(\frac{1}{j\omega C_X} + j\omega L_{stray\_C_X}\right) \cdot \frac{R_{div1} + R_{div2} + 1/j\omega C_{sense}}{(1 + G_2) \cdot R_{div2} + R_{div1} + 1/j\omega C_{sense}} \quad \text{(XI)}$$

Here, in a high frequency range, the capacitance value $C_{sense}$ of the voltage detection capacitor 26, 27 and the resistance values $R_{div1}$, $R_{div2}$ of the voltage detection partial pressure 56, 57 are selected such that the impedance of the voltage detection capacitor 26, 27 is ignorable with respect to the impedance of the voltage detection voltage dividing resistor 56, 57, so that Equation (XI) can be regarded as Equation (XII) below.

[Equation 11]

$$Z_{C_X} = 2 \cdot \left(\frac{1}{j\omega C_X} + j\omega L_{stray\_C_X}\right) \cdot \frac{R_{div1} + R_{div2}}{(1 + G_2) \cdot R_{div2} + R_{div1}} \quad \text{(XII)}$$

Here, since the voltage dividing ratio of the voltage detection voltage dividing resistor 56, 57 is expressed by Equation (XIV) below, Equation (XII) is expressed by Equation (XIII) below and further expressed by Equation (XV).

[Equation 12]

$$Z_{C_X} = \frac{2}{K \cdot \left\{(1 + G_2) + \frac{R_{div1}}{R_{div2}}\right\}} \cdot \left(\frac{1}{j\omega C_X} + j\omega L_{stray\_C_X}\right) \quad \text{(XIII)}$$

$$K = \frac{R_{div2}}{R_{div1} + R_{div2}} \quad \text{(XIV)}$$

[Equation 13]

$$Z_{C_X} = \frac{2}{1 + K \cdot G_2} \cdot \left(\frac{1}{j\omega C_X} + j\omega L_{stray\_C_X}\right) \quad \text{(XV)}$$

Equation (XV) means that it is equivalent to the capacitance value of the X capacitor 41, 42 being $(1+K \cdot G_2)$ times in a configuration in which the two X capacitors 41, 42 ($C_X$) are connected in series between the power supply lines 11, 12. That is, due to compensation of the differential amplifier circuit 64 of the dual mode active filter compensation circuit 23, the capacitance value of the X capacitor 41, 42 apparently increases $(1+K \cdot G_2)$ times. Note that the inductance value of the parasitic inductance 66 is equivalently reduced $(1/(1+K \cdot G_2))$.

As described above, since the differential amplifier circuit 64 that differentially amplifies the differential mode voltage $v_{HV\_dif}$ detected by the detection unit 29 is provided and the output voltage of the differential amplifier circuit 64 is applied as the differential mode compensation voltage $v_{comp\_dif}$ to the X capacitor 41, 42 with the positive side and the negative side reversed, the apparent capacitance value of the X capacitor 41, 42 increases $((1+K \cdot G_2)$ times) according to the gain $G_2$ of the differential amplifier circuit 64.

Figure 7:
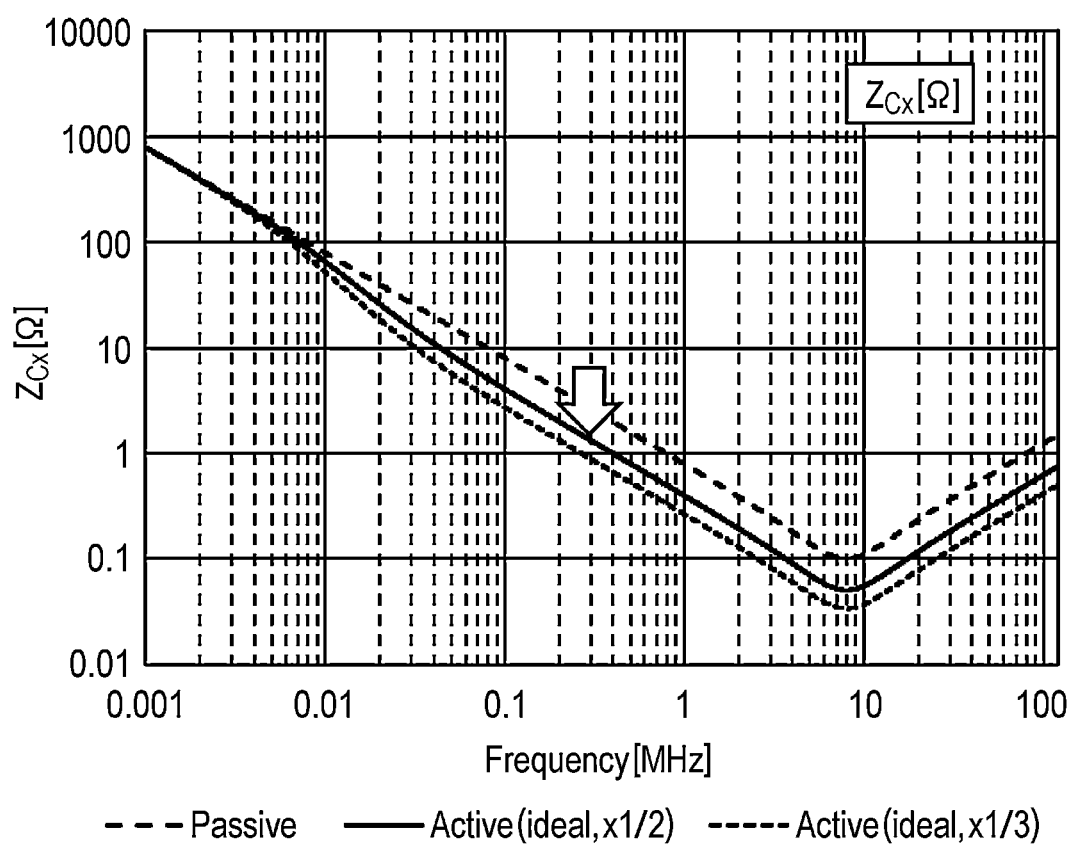
FIG. 7 is a graph showing impedance characteristics of an X capacitor for describing a differential mode noise reduction action by the active filter device of the present invention.

A wide broken line in FIG. 7 indicates impedance characteristics of an X capacitor of the normal passive noise filter, and a solid line and a fine broken line indicate impedance characteristics of the X capacitor in the active filter device 1 of the present invention. Note that $Z_{CX}$ represents the impedance of the X capacitor, the solid line indicates the case of $(1+K \cdot G_2)=2$, and the fine broken line indicates the case of $(1+K \cdot G_2)=3$. As is clear from this figure, according to the active filter device 1 of the present invention, the capacitance value of the X capacitor apparently increases, and the impedance $Z_{CX}$ decreases according to the value of the gain $G_2$ as compared to the normal passive noise filter.

With the increase in the apparent capacitance value of the X capacitor 41, 42, it is possible to increase the reflux of the differential mode noise current indicated by an arrow indicated by a dash-dot line in FIG. 2, reduce the differential mode current leaking to the power supply side, and reduce the differential mode noise without using a large capacity X capacitor or a large normal mode choke coil.

In the example, the voltage detected by the single detection unit 29 including the pair of voltage detection capacitors 26, 27 is input to the inverting amplifier circuit 37 and the differential amplifier circuit 64, and therefore, the circuit configuration of the detection unit 29 can be simplified.

Further, in the example, the ground path 38 of the detection unit 29 and the ground path 39 of the inverting amplifier circuit 37 are separately connected to the circuit ground 30, and therefore, it is possible to reduce an adverse effect on detection of the common mode voltage by the detection unit 29 due to voltage fluctuation with respect to the circuit ground 30 due to the operation current of the inverting amplifier circuit 37.

Example 2

Figure 8:
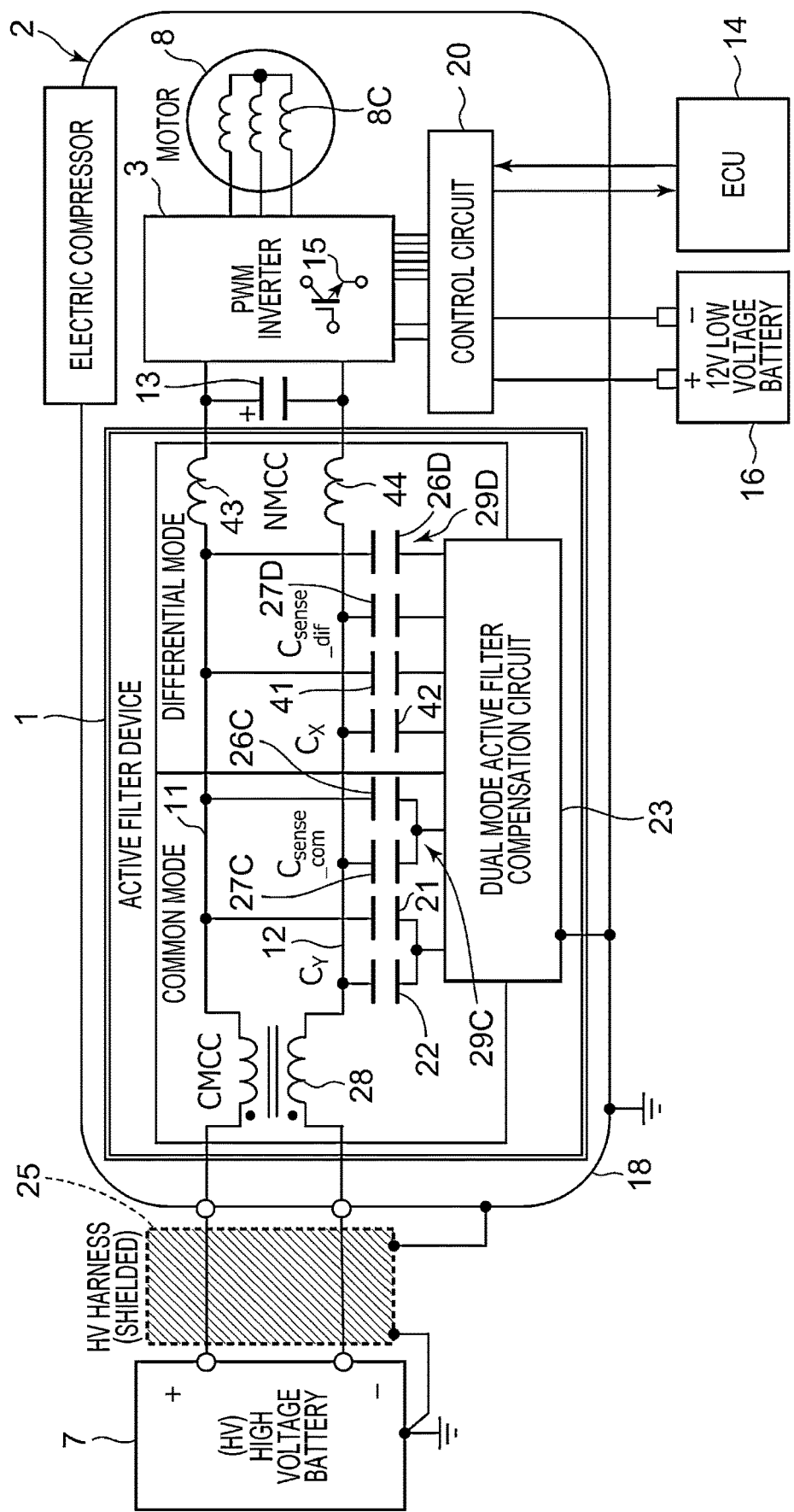
FIG. 8 is a diagram showing another example of the electric circuit of the electric compressor of FIG. 1 and the power supply path to the electric compressor (Example 2)

Next, FIG. 8 shows an electric circuit diagram of an electric compressor 2 according to another example of the present invention and a power supply path to the electric compressor 2. Note that in this figure, the same reference numerals as those in FIG. 1 indicate elements having the same or similar functions. In the case of this example, detection units (indicated by reference numerals 29C, 29D) are each provided for the inverting amplifier circuit 37 and the differential amplifier circuit 64 of the dual mode active filter compensation circuit 23.

In this case, the detection unit 29C for the inverting amplifier circuit 37 includes common mode voltage detection capacitors 26C, 27C having one ends connected to the power supply lines 11, 12 and the common mode voltage detection resistor 36 (FIG. 2) connected to the other ends, and the detection unit 29D for the differential amplifier circuit 64 includes differential mode voltage detection capacitors 26D, 27D having one ends connected to the power supply lines 11, 12 and the voltage detection voltage dividing resistors 56, 57 (FIG. 2) connected to the other ends.

As described above, the detection units 29C, 29D are each provided for the inverting amplifier circuit 37 and the differential amplifier circuit 64, and therefore, there is an advantage that it is possible to obtain noise voltage detection characteristics according to common mode and differential mode frequency characteristics.

Example 3

Figure 9:
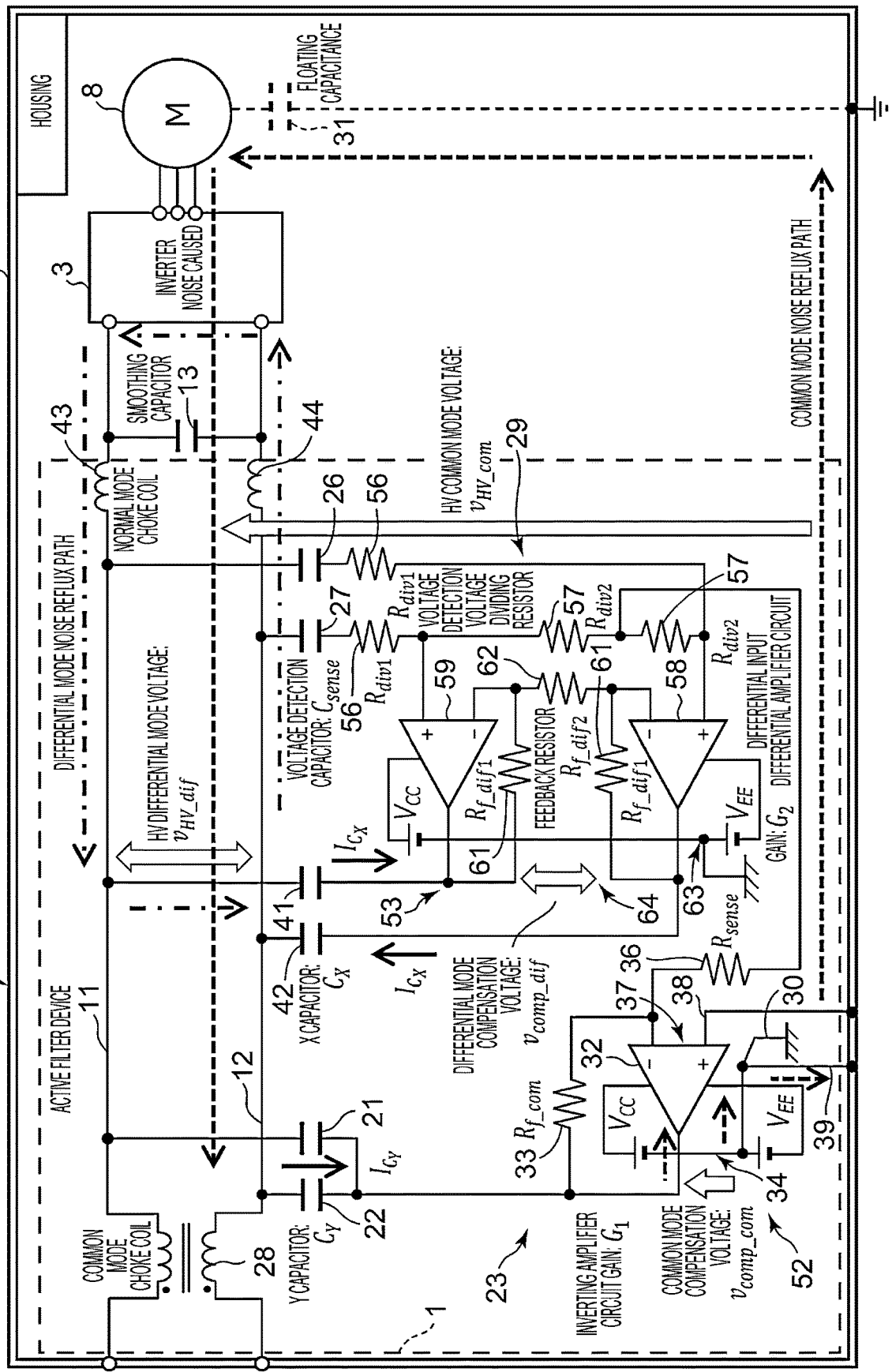
FIG. 9 is a diagram showing still another example of the electric circuit of the electric compressor of FIG. 2 (Example 3).

Next, FIG. 9 shows an electric circuit of still another example of the electric compressor 2 of the present invention. Note that in this figure, the same reference numerals as those in FIGS. 1 and 2 indicate the same elements. In the case of this example, the ground path 38 of the detection unit 29 is directly connected to the housing 18 (ground potential), and the ground path 39 of the power supply circuit 34 of the amplifier 32 (ground path of the inverting amplifier circuit 37) is connected to the circuit ground 30 as described above.

As in this example, in a case where the housing 18 has the ground potential, the circuit ground 30 is connected to the housing 18, the ground path 38 of the detection unit 29 is connected to the housing 18, and the ground path 39 of the inverting amplifier circuit 37 is connected to the circuit ground 30, it is possible to eliminate a detection error of the detection unit 29 due to potential fluctuation in the circuit ground 30 caused by the operation current of the inverting amplifier circuit 37.

Note that in the example, the active filter device 1 of the present invention is applied to the electric compressor 2 forming the refrigerant circuit of the vehicle air-conditioning device. However, the invention of claim 1 to claim 5 are not limited thereto, and the present invention is effective for various household/commercial instruments which require reduction in the common mode noise and the differential mode noise.

LIST OF REFERENCE SIGNS

1 Active Filter Device
2 Electric Compressor
3 Inverter Device
7 High Voltage Battery (DC Power Supply)
8 Motor
11, 12 Power Supply Line
15 Switching Element
18 Housing
20 Control Circuit
21, 22 Y Capacitor
23 Dual Mode Active Filter Compensation Circuit
26, 27, 26C, 27C, 26D, 27D Voltage Detection Capacitor
28 Common Mode Choke Coil
29 Detection Unit
30 Circuit Ground
32, 58, 59 Amplifier (Operational Amplifier Alone or Operational Amplifier Including Current Amplifier as Output)
33 Negative Feedback Resistor
36 Common Mode Voltage Detection Resistor
37 Inverting Amplifier Circuit
38 Ground Path
41, 42 X Capacitor
43, 44 Normal Mode Coil
52 Common Mode Voltage Compensation Unit
53 Differential Mode Voltage Compensation Unit
56, 57 Voltage Detection Voltage Dividing Resistor
61, 62 Feedback Resistor
64 Differential Amplifier Circuit

The invention claimed is:

1. An active filter device comprising:
a common mode choke coil inserted into a pair of positive-side and negative-side power supply lines;
a normal mode choke coil connected to the pair of power supply lines or one of the power supply lines;
a detection unit that detects voltages of the pair of power supply lines;
an inverting amplifier circuit that inverts and amplifies a common mode voltage detected by the detection unit;
a Y capacitor connected between an output of the inverting amplifier circuit and the pair of power supply lines;
a differential amplifier circuit that differentially amplifies a differential mode voltage between the pair of power supply lines, which is detected by the detection unit; and
an X capacitor connected between an output of the differential amplifier circuit and the pair of power supply lines,
wherein an output voltage of the inverting amplifier circuit is applied to the Y capacitor, and
an output voltage of the differential amplifier circuit obtained by amplifying the voltage of the positive-side power supply line is applied to the X capacitor connected to the negative-side power supply line, and an output voltage of the differential amplifier circuit obtained by amplifying the voltage of the negative-side power supply line is applied to the X capacitor connected to the positive-side power supply line.

2. The active filter device according to claim 1, wherein the differential amplifier circuit includes a positive-side amplifier having a non-inverting input terminal to which the voltage of the positive-side power supply line detected by the detection unit is input as a differential input signal, and a negative-side amplifier having a non-inverting input terminal to which the voltage of the negative-side power supply line detected by the detection unit is input as a differential input signal, and the X capacitor connected to the negative-side power supply line is connected to an output of the positive-side amplifier, and the X capacitor connected to the positive-side power supply line is connected to an output of the negative-side amplifier.

3. The active filter device according to claim 1, wherein a voltage detected by a single detection unit including a pair of voltage detection capacitors is input to the inverting amplifier circuit and the differential amplifier circuit.

4. The active filter device according to claim 1, wherein the detection unit is provided for each of the inverting amplifier circuit and the differential amplifier circuit.

5. The active filter device according to claim 1, wherein a ground path of the detection unit and a ground path of the inverting amplifier circuit are separately connected to a circuit ground.

6. An electric compressor comprising: the active filter device according to claim 1; and an inverter device, wherein the active filter device and the inverter device are provided integrally with a housing.

7. The electric compressor according to claim 6, wherein the housing has a ground potential, and the circuit ground is connected to the housing, and the ground path of the detection unit is connected to the housing, and the ground path of the inverting amplifier circuit is connected to the circuit ground.

* * * * *